(12) United States Patent
Rosenthal

(10) Patent No.: US 7,695,135 B1
(45) Date of Patent: Apr. 13, 2010

(54) SCLERAL LENS WITH SCALLOPED CHANNELS OR CIRCUMFERENTIAL FENESTRATED CHANNELS

(75) Inventor: Perry Rosenthal, Newton, MA (US)

(73) Assignee: Boston Foundation for Sight, Needham, MA (US)

( * ) Notice: Subject to any disclaimer, the term of this patent is extended or adjusted under 35 U.S.C. 154(b) by 0 days.

(21) Appl. No.: 12/268,665

(22) Filed: Nov. 11, 2008

(51) Int. Cl.
G02C 7/04 (2006.01)
(52) U.S. Cl. .................................. 351/160 R
(58) Field of Classification Search ... 351/160 R–160 H
See application file for complete search history.

(56) References Cited

U.S. PATENT DOCUMENTS

| | | | |
|---|---|---|---|
| 2,117,770 A | 5/1938 | Dunn | |
| 2,196,066 A | * 4/1940 | Feinbloom | 351/219 |
| 2,989,894 A | 6/1961 | Gordon | |
| 4,621,912 A | 11/1986 | Meyer | |
| 5,104,213 A | 4/1992 | Wolfson | |
| 5,166,710 A | 11/1992 | Hofer et al. | |
| 5,452,031 A | 9/1995 | Ducharme | |
| 5,500,695 A | 3/1996 | Newman et al. | |
| 5,815,236 A | 9/1998 | Vayntraub | |
| 5,815,237 A | 9/1998 | Vayntraub | |
| 5,975,694 A | 11/1999 | Vayntraub | |
| 6,082,856 A | 7/2000 | Dunn et al. | |
| 6,095,651 A | 8/2000 | Williams et al. | |
| 6,145,988 A | 11/2000 | Manfredini et al. | |
| 6,176,579 B1 | 1/2001 | Mandell | |
| 6,199,986 B1 | 3/2001 | Williams et al. | |
| 6,206,520 B1 | 3/2001 | Jubin et al. | |
| 6,241,355 B1 | 6/2001 | Barsky | |
| 6,270,221 B1 | 8/2001 | Liang et al. | |
| 6,271,914 B1 | 8/2001 | Frey et al. | |
| 6,271,915 B1 | 8/2001 | Frey et al. | |
| 6,299,311 B1 | 10/2001 | Williams et al. | |
| 6,305,802 B1 | 10/2001 | Roffman et al. | |
| 6,340,229 B1 | 1/2002 | Lieberman et al. | |
| 6,364,482 B1 | 4/2002 | Roffman et al. | |
| 6,379,005 B1 | 4/2002 | Williams et al. | |
| 6,406,145 B1 | 6/2002 | Jubin | |
| 6,419,359 B2 | 7/2002 | Edwards | |
| 6,454,409 B1 | 9/2002 | Lorenz et al. | |
| 6,491,392 B2 | 12/2002 | Roffman et al. | |
| 6,497,483 B2 | 12/2002 | Frey et al. | |
| 6,499,843 B1 | 12/2002 | Cox et al. | |
| 6,554,427 B1 | 4/2003 | Davis et al. | |
| 6,558,586 B1 | 5/2003 | Padiou et al. | |

(Continued)

OTHER PUBLICATIONS

Ezekiel, D., "Gas permeable haptic lenses," J. Br. Contact Lens Assoc. 6: 158, 160-161 (1983).

(Continued)

Primary Examiner—Darryl J Collins
(74) Attorney, Agent, or Firm—Wilmer, Cutler, Pickering, Hale and Dorr

(57) ABSTRACT

A scleral lens is provided with scalloped channels on its posterior surface to improve the flow of fluid between the scleral lens and the eye. Also provided is a scleral lens with a fenestrated channel circumscribing the intersection of the optic portion and the scleral portion of the lens. The circumferential fenestrated channel prevents adhesion and suction between the lens and the eye, and improves comfort, vision, and the fitting process.

19 Claims, 7 Drawing Sheets

U.S. PATENT DOCUMENTS

| | | | |
|---|---|---|---|
| 6,569,154 | B2 | 5/2003 | Campin et al. |
| 6,578,963 | B2 | 6/2003 | Pettit |
| 6,586,499 | B2 | 7/2003 | Bonafini, Jr. et al. |
| 6,595,639 | B1 | 7/2003 | Ho et al. |
| 6,595,640 | B1 | 7/2003 | Jubin |
| 6,779,888 | B2 | 8/2004 | Marmo |
| 2002/0021409 | A1 | 2/2002 | Marmo |
| 2005/0119739 | A1 | 6/2005 | Glazier |
| 2006/0290883 | A1 | 12/2006 | Rosenthal |
| 2007/0242216 | A1* | 10/2007 | Dootjes et al. .............. 351/161 |

OTHER PUBLICATIONS

Rosenthal et al. "Fluid-Ventilated, Gas-Permeable Scleral Contact Lens Is an Effective Option for Managing Severe Ocular Surface Disease and Many Corneal Disorders that Would Otherwise Require Penetrating Keratoplasty," Reprinted from Eye & Contact Lens, vol. 31 No. 3, May 2005, pp. 130-134.

Romero-Rangel, et al., "Gas-permeable Scleral Contact Lense Therapy in Ocular Surface Disease," American Journal of Ophthalmology, vol. 130, Jul. 2000, pp. 25-32.

Rosenthal, et al. "Treatment of Persistent Corneal Epithelial Defect With Extended Wear of a Fluid-ventilated Gas-permeable Scleral Contact Lens," American Journal of Ophthalmology, vol. 130, Jul. 2000, pp. 33-41.

Schein, et al., "A Gas-Permeable Scleral Contact Lens for Visual Rehabilitation," American Journal of Ophthalmology, vol. 109, Mar. 1990, pp. 318-322.

New Contact Lens Lets Blind See, Boston, Sep. 4, 2003, 1 page.

Lakefield, B.R., "Seeing is Believing," US Airways Attache, Sep. 2004, 1 page.

Egan, K., "Bringing Back the Gift of Sight Puts a Whole Life Back in Focus," The Otawa Citizen, 2 pages.

Melba Newsome, "Out of the Darkness," Good Housekeeping, Feb. 2006, pp. 119-120.

Blood & Marrow Transplant Newsletter, "A Site for Sore Eyes," http://www.bmtinfonet, 3 pages.

Guttman, C. "Scleral Lens an Important Tool in Many 'last resort' Scenarios," Ophthalmology Times, Sep. 1, 2005, 2 pages.

Moore, A.S., "A New Lens Restores Vision and Brings Relief," The New York Times, Jul. 1, 2003, 2 pages.

* cited by examiner

SCLERAL LENS WITH SCALLOPED CHANNELS OR CIRCUMFERENTIAL FENESTRATED CHANNELS

TECHNICAL FIELD

This disclosure relates generally to a scleral lens.

BACKGROUND

The eye's most important focusing lens is the cornea, the transparent dome-shaped front part of the eye. The cornea must have a perfectly smooth surface in order to provide clear vision. If the corneal surface is irregular, such as from disease or injury, the eye can no longer focus clearly, even with the strongest glasses. If a person has an irregular cornea, hard corneal contact lenses can improve his or her vision by creating a smooth layer of tears that fills in the surface irregularities of the cornea. A hard corneal contact lens rests on and slides over the cornea, and creates friction between the lens and the cornea. Many people with damaged corneas cannot be fitted with a hard corneal contact lens because they cannot tolerate the discomfort and pain caused by this friction.

A scleral lens is a rigid contact lens that rests on the sclera of the eye; some scleral contact lenses rest on the peripheral surface of the cornea while others do not touch the cornea at all. The scleral lens defines a compartment of fluid between the inner surface of the scleral lens and the cornea, referred to herein as the "fluid compartment." The portion of the scleral lens that contacts the sclera is referred to as the "scleral portion" of the scleral lens, or as the "haptic." The portion of the scleral lens that covers the cornea is called the "optic portion" of the scleral lens. The optic portion may optionally be corrective. The greatest distance between the surface of the cornea and the posterior portion of the optic portion is at least 30μ. As used herein, the posterior side of the scleral lens is the side that is disposed on the eye.

Scleral lenses are advantageous for patients with corneal disease because they can avoid all contact with the diseased cornea, while the fluid compartment bathes the cornea in artificial tears. One issue with scleral contact lenses is that the lens can start to adhere to the cornea. This problem occurs because mucin, a glue-like material produced by the surface cells of the cornea, can accumulate and over time and fill the space between the cornea and the scleral lens. Under these circumstances, mucin adheres to the opposing surfaces of the scleral lens and cornea and gradually shrinks in volume, thus pulling the rigid lens against the cornea with sufficient compression to cause discomfort. As mucin production continues, the mucin becomes compacted by the pressure of the lens. This pressure squeezes aqueous fluid out of the mucin, increasing its hydrophobicity and thereby causing the mucin to contract.

Adhesion can be prevented by creating a deep fluid compartment between the lens and cornea so that mucin does not fill the space between the scleral lens and the cornea. However, a deep fluid compartment increases the prominence of the optic surface of the lens. This can make the lens uncomfortable to wear. A deep fluid compartment also increases the amount of fluid oxygen must pass through to reach the eye, and thus reduces the amount of oxygen that reaches the cornea. Thus a deep fluid compartment has disadvantages.

Suction can develop between the scleral lens and the cornea. During blinking, the scleral lens compresses against the eye and squeezes fluid out of the fluid compartment. If this fluid is not rapidly replaced when the lens decompresses, it functions like a one-way valve and becomes suctioned to the eye over time. This can be dangerous to the eye.

Fenestrations have been previously used to prevent suction. Ezekiel, D., "Gas permeable haptic lenses," *J. Br. Contact Lens Assoc.* 6:158-161 (1983). However, fenestrations are often ineffective in preventing lens adhesion.

A scleral lens with channels is described in U.S. application Ser. No. 11/473,290 (published as US 2006/0290883), which is incorporated herein by reference in its entirety. A method of making such a scleral lens is described in U.S. Pat. No. 5,452,031, which is incorporated herein by reference in its entirety.

SUMMARY

Disclosed herein is a scleral lens that allows for agitation and improved flow of fluid under the optic portion of the scleral lens to prevent adhesion and suction. The scleral portion of the lens defines one or more channels, also referred to herein as grooves. The channels in the scleral lens extend radially from the inside border of the scleral portion of the lens. The channels can have several different configurations to assist in the transit of fluid between the fluid compartment and the fluid external to the lens. The channels may have one of a number of different configurations, such as a U-shaped cross-section, a V-shaped cross section, or a beveled cross-section. The cross-section can have the same dimension along its length, or it can vary along the radial extension of the channel. Plural channels may be used. The channels may have a serpentine configuration or generally arcuate configuration. The outside rim of the scleral lens defines a scallop at the end of each channel. The scallop elevates the outer termination of the channel to improve fluid exchange.

Further disclosed herein is a scleral lens that prevents adhesion and suction between the scleral lens and the eye, wherein a channel defined by the posterior side of the scleral lens circumscribes the peripheral portion of the optic portion of the lens anterior to the scleral portion of the lens such that the channel lies over the peripheral surface of the cornea when it is worn, and the channel is fenestrated to the anterior portion of the lens. The lens also allows for improved comfort and vision, and for easier fitting. The channel may have different cross sections, such as a U-shaped cross-section, a V-shaped cross section, or a beveled cross-section. The fenestrations may be circular, ovoid, or polygonal. The fenestrations may also be slots.

In one aspect, the present disclosure relates to a scleral lens to be disposed on an eye, the scleral lens comprising an optic portion having a first curvature, and a scleral portion having a second curvature, wherein the first curvature is adapted to cover a cornea of the eye without substantially touching the cornea; the second curvature is adapted to contact the scleral portion of the eye without substantially touching the cornea; the optic portion and the scleral portion intersect to form an angle less than 180 degrees measured from the anterior side of the scleral lens; the scleral portion has an inner rim bounding the optic portion and an outside rim bounding the outside of the scleral lens; the scleral portion further comprises at least one channel extending radially from the inner rim to the outside rim; and the outside rim of the scleral portion defines a scallop where the channel intersects the outside rim of the scleral portion.

In some embodiments of the scleral lens, the at least one channel is arcuate. In other embodiments, the at least one channel is serpentine.

In some embodiments of the scleral lens, the width of the scallop ranges from about 3% to about 17% of the circumference of the outside rim of the scleral portion. In other embodiments, the width of the scallop ranges from about 10° to about 60° of the circumference of the outside rim of the scleral portion. In still other embodiments, the angle of the scallop at the intersection of the channel and the outside rim of the scleral lens ranges from about 0° to about 90°. In some embodiments, the depth of the scallop is less than about 80% of the length between the inner rim and the outside rim of the scleral lens.

In some embodiments of the scleral lens, the second curvature is adapted to contact the scleral portion of the eye such that the scleral portion of the lens touches the scleral portion of the eye and only the peripheral portion of the cornea.

In another aspect, the present disclosure relates to a scleral lens to be disposed on an eye, the scleral lens comprising an optic portion having a first curvature, and a scleral portion having a second curvature, wherein the first curvature is adapted to cover a cornea of the eye without substantially touching the cornea; the second curvature is adapted to contact the scleral portion of the eye without substantially touching the cornea; the optic portion and the scleral portion intersect to form an angle less than 180 degrees measured from the anterior side of the scleral lens; the optic portion further comprises a channel circumscribing the entire optic portion of the scleral lens such that the channel lies over the peripheral surface of the cornea when the scleral lens is disposed on the eye; and the channel further comprises at least one fenestration to the anterior side of the lens.

In one embodiment of the scleral lens, the one or more fenestrations are round. In another embodiment, the diameter of the one or more fenestrations are between about 100μ to about 0.2 mm. In another embodiment, the one or more fenestrations are not round. In yet another embodiment, the one or more fenestrations are rectangular. In other embodiments, the one or more fenestrations are oval. In some embodiments the narrowest dimension of the one or more fenestrations is between about 100μ to about 0.2 mm.

In another embodiment of the scleral lens, the scleral lens prevents the accumulation of cellular debris and mucin between the eye and the scleral lens. In other embodiments, the scleral lens prevents suction between the eye and the scleral lens. In still other embodiments, the scleral lens prevents adhesion between the eye and the scleral lens.

In other embodiments of the scleral lens, the second curvature is adapted to contact the scleral portion of the eye such that the scleral portion of the lens touches the scleral portion of the eye and only the peripheral portion of the cornea.

BRIEF DESCRIPTION OF THE DRAWINGS

In the Drawings:

FIG. 3A is an enlarged cross-sectional view of a channel taken along line 3A-3A of FIG. 3.

DETAILED DESCRIPTION

1. Scleral Lens

Figure 1:
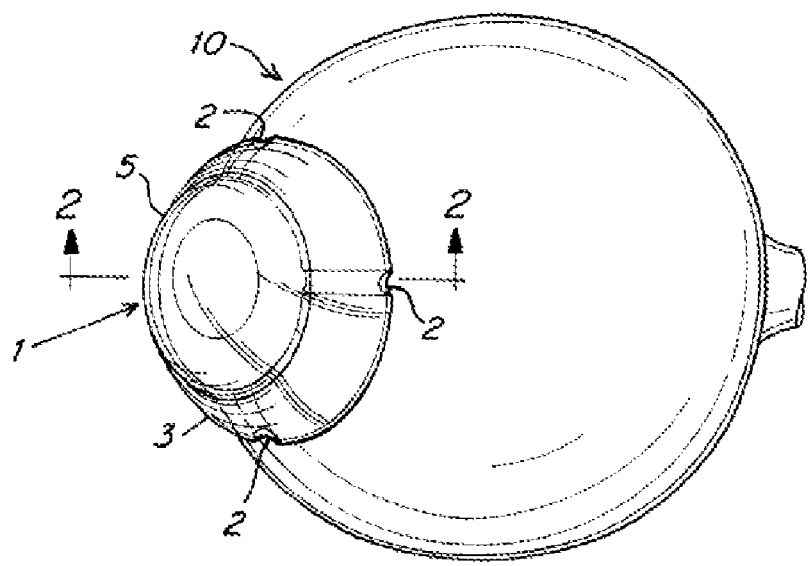
FIG. 1 is a perspective view of an eye with a scleral lens with scalloped channels.
Figure 2:
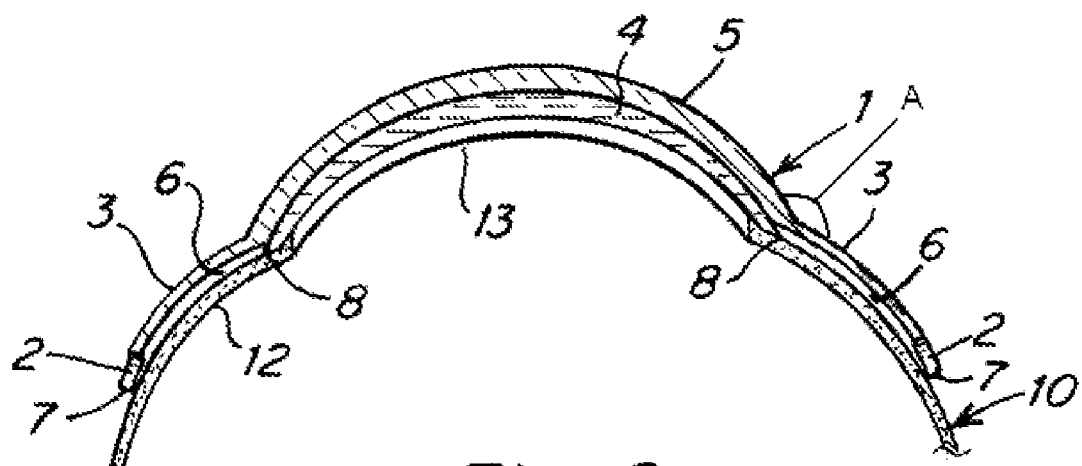
FIG. 2 is a cross-sectional view taken along line 2-2 of FIG. 1.

Referring to FIGS. 1 and 2, a scleral lens 1 rests on the anterior portion of an eye 10. Scleral lens 1 is a rigid contact lens that rests on the sclera 12 of the eye but either does not touch the cornea 13 or just touches a peripheral surface of cornea 13. The eye and lens 1 define a fluid compartment 4 between the inner surface of the scleral lens and the cornea.

The portion of the scleral lens 1 that touches the sclera 12 is referred to as the scleral portion 3 of the scleral lens, or as the "haptic." The portion of the scleral lens that covers the cornea 13 is referred to here as the optic portion 5 of the scleral lens. The optic portion may optionally be corrective. The greatest distance between the surface of the cornea and the posterior portion of the optic portion is typically at least 30 microns. As used herein, the posterior side of the scleral lens is the side that is disposed on the eye.

As shown in FIG. 2, the curvature of scleral portion 3 is not the same as the curvature of optic portion 5. This difference in curvature causes the optic portion to protrude away from the eye 10 when disposed on the eye, while the scleral portion conforms to the curvature of the scleral portion of the eye, as shown in FIG. 2. FIG. 2 also shows that the intersection of the optic portion and the scleral portion forms an angle, A. Angle A may be uniform throughout the intersection of the optic portion and the scleral portion. Alternatively, angle A may vary throughout the intersection of the optic portion and the scleral portion. Angle A is always less than 180 degrees.

The first and second curvatures may be portions of spheres with constant radii. Alternatively, the first and second curvatures are not portions of a sphere, so that the first and second curvatures do not have constant radii. Alternatively, the first and second curvatures are adapted based on the topography of the cornea or the sclera of an eye. Scleral lenses with curvatures that do not have constant radii, or that are adapted based on the topography of the cornea or the sclera of an eye, are described in U.S. Pat. No. 5,452,031 at column 4, line 30 through column 9, line 22, which is incorporated herein by reference in its entirety.

2. Scalloped Channels

Figure 3:
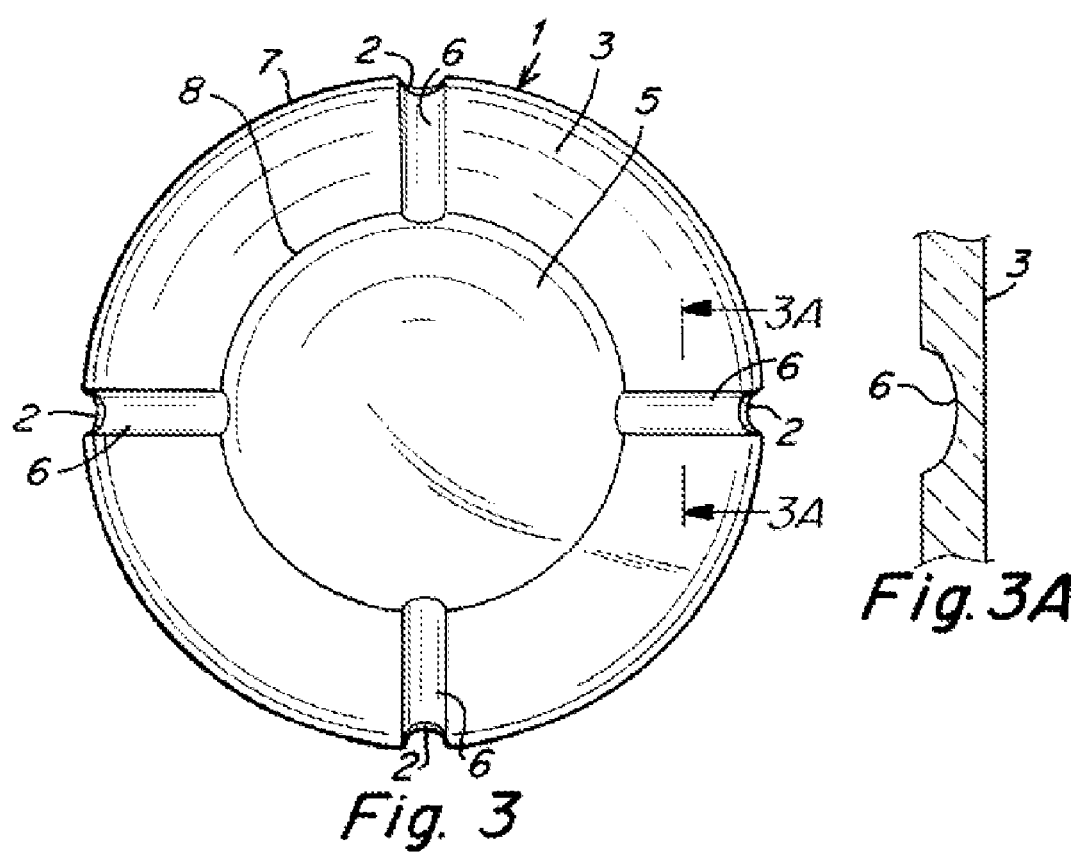
FIG. 3 is a plan view of a scleral lens with scalloped channels.

FIGS. 2, 3, and 3A show a scleral lens with channels 6 to improve the flow of tears from outside the lens into the fluid compartment 4. Channels 6 are defined by the posterior side of the lens and extend generally radially from the outside rim 7 of the scleral lens to the inner rim 8 of the scleral portion. As illustrated in FIG. 1, the edge of the channel has a scallop 2 where the channel meets the outside rim of the lens.

Referring to FIGS. 2 and 3, a scallop 2 defines a recessed area from the outside rim 7 of the scleral lens 1 towards the optic portion 5 of the scleral lens. The scallop may be rounded or have angular edges. The scallop may be triangular, square, or any other polygonal shape. The scallop may be symmetrical or asymmetrical. The scallop advantageously lifts the end of the channel 6 at the outside rim above the surface of the sclera and improves the movement of fluid between the fluid compartment 4 and the fluid external to the scleral lens. This advantageously reduces suction and adhesion between the eye 10 and the scleral lens.

Figure 4:
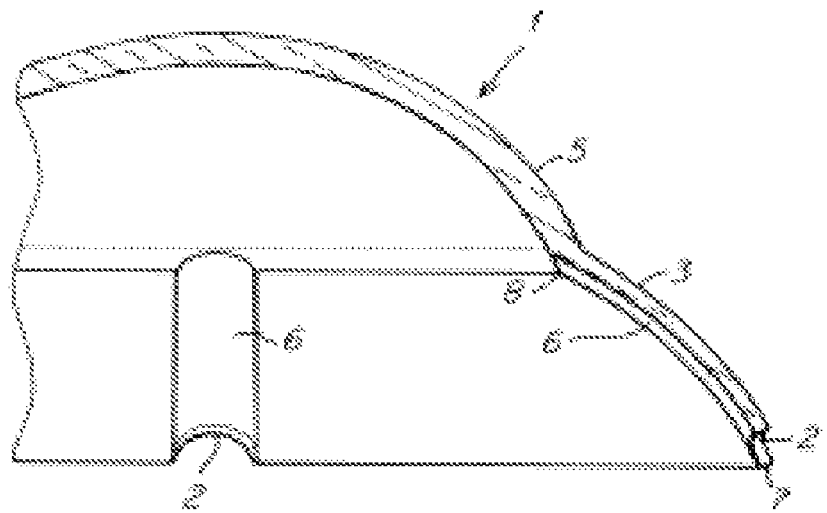
FIGS. 4 and 5 are enlarged fragmentary cross-sectional views of particular embodiments of scleral lenses.
Figure 5:
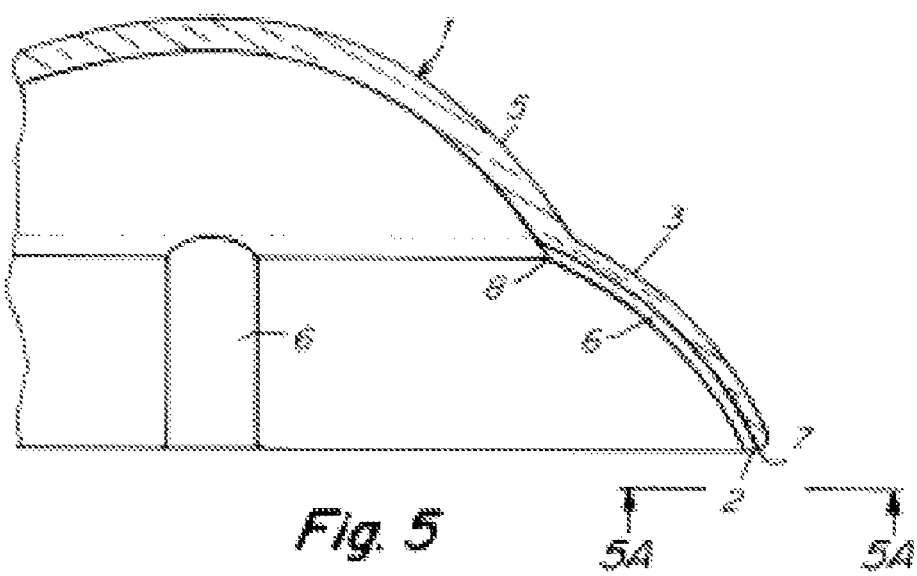
Figure 5A:
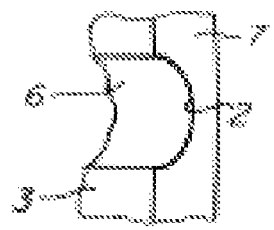
FIG. 5A is an enlarged fragmentary plan view as seen along line 5A-5A of FIG. 5.
Figure 6:
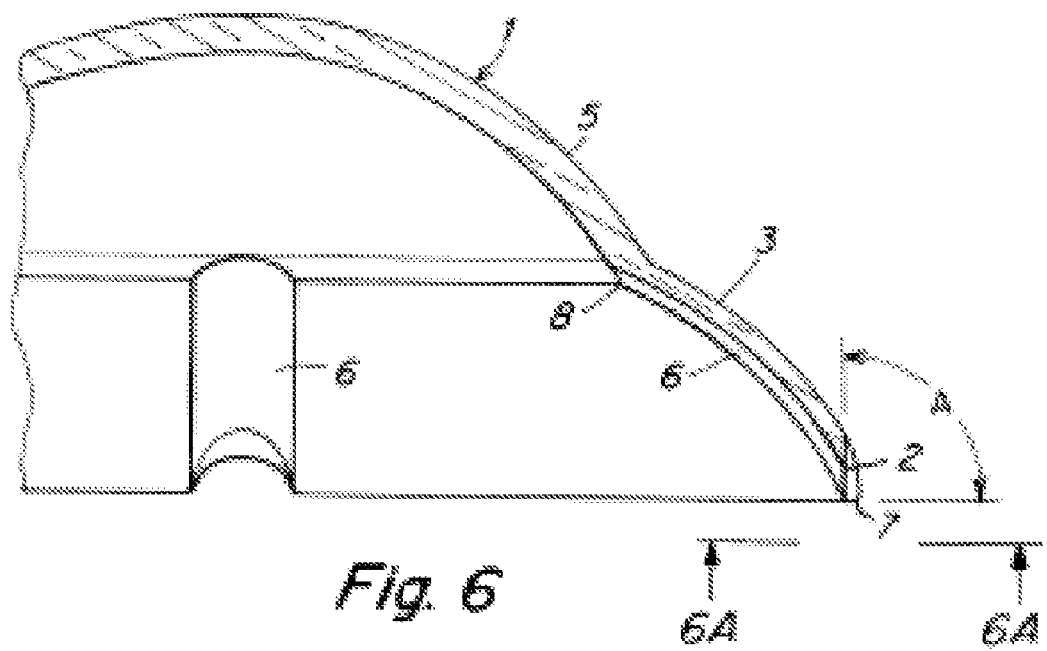
FIG. 6 is an enlarged fragmentary cross-sectional view of a scleral lens with a steep intersection angle of the scallop with the outside rim of the lens.
Figure 6A:
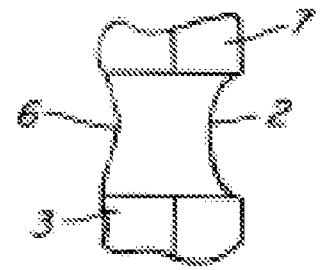
FIG. 6A is an enlarged fragmentary plan view of a scalloped channel in a scleral lens as seen along line 6A-6A of FIG. 6.

Referring to FIGS. 4, 5, and 6, the angle of the scallop 2 at the intersection of the channel 6 and the outside rim 7 of the scleral lens 1 ranges from about 0° to about 90°. FIG. 5A shows a 0° angle of intersection between the channel and the outside rim of the scleral lens. FIG. 6 shows a 90° angle A of intersection between the channel and the outside rim of the scleral lens.

In some embodiments, the width of the scallop ranges from about 3% to about 17% of the circumference of the outer rim of the scleral portion of the scleral lens. In other embodiments, the width of the scallop ranges from about to 10° to about 60° of the circumference of the outer rim of the scleral portion of the scleral lens. The depth of the scallop is less than about 80% of the length between the inner rim and the outside rim of the scleral lens.

Figure 11A:
FIGS. 11A-E are cross-sectional views of different embodiments of the channel from FIGS. 1-6.

The channel may have one or more of several different cross-sections. As illustrated in FIG. 11A, the channel 36 may have a generally square cross-section. The dimensions of the channel can be modified to allow for improved fluid flow into the fluid compartment after the lens is decompressed following each blink while blocking the transit of air bubbles and tear particulate matter. The number of channels can be selected, up to about 36. The channels can be evenly distributed along the scleral contact surface or, depending on desired fluid flow characteristics, can be placed unevenly around the scleral contact surface.

Figure 11B:

As illustrated in FIG. 11B a channel 40 may have a U-shaped cross-section. This may provide advantages such as improved tear flow and a decrease in particulate matter getting caught in the "corners" of the channel. Alternatives to a symmetrical U-shape exist within the scope of the claimed scleral lens. For example, depending on the radius R of the curve that creates the U-shape, the bottom of the channel could be shallow or have steeper edges. A preferred radius R is about one half the width of the channel.

Figure 11C:
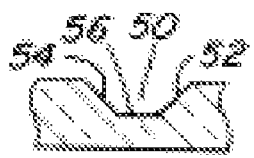
Figure 11D:
Figure 11E:

Other cross-sectional configurations can be used. For example, FIGS. 11C and 11D illustrate channels with angled side walls and bottom. As illustrated in FIG. 11C, a channel 50 with side walls 52 and 54 can create any angle over 90 degrees to the bottom 56 of the channel 50. FIG. 11D illustrates a channel 58 with angled side walls 60 and 62, and which include an angle less than 90 degrees with the bottom 64 of the channel 58. Another alternative construction is illustrated in FIG. 11E where a channel 66 has cross section is in the shape of a diamond. The various shapes described can be combined to form hybrid cross sections that provide the necessary fluid flow.

Figure 12:
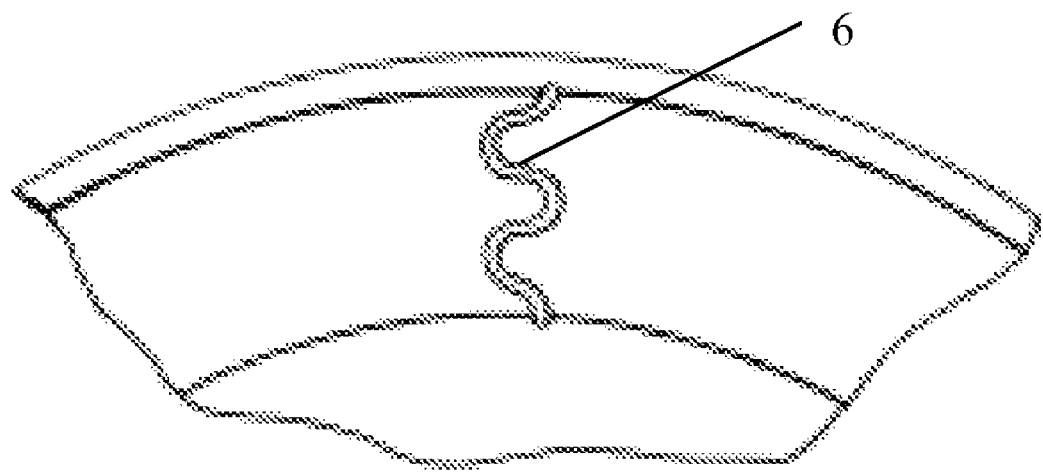
FIG. 12 is an enlarged fragmentary plan view of an alternate embodiment of a channel with a serpentine configuration.
Figure 13:
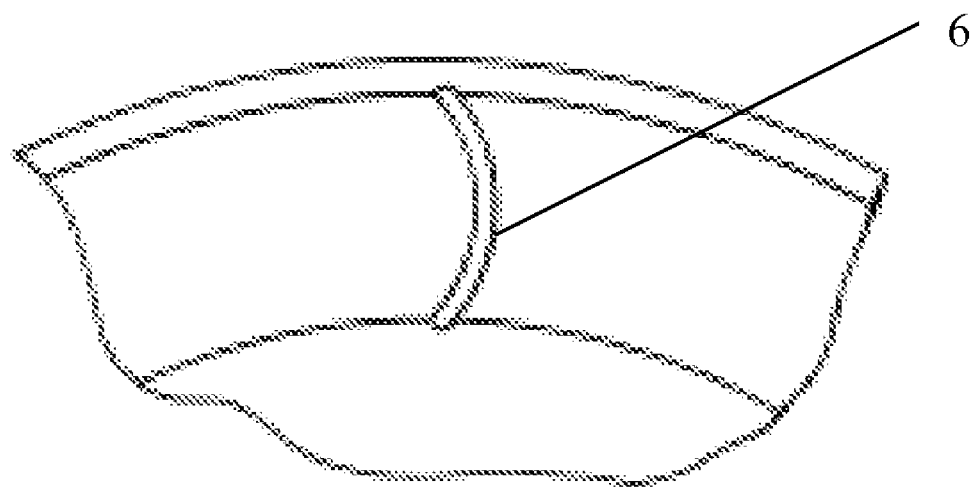
FIG. 13 is an enlarged fragmentary plan view of an alternate embodiment of a channel with an arcuate configuration.

As illustrated in FIGS. 12 and 13, the radially extending channels can have different configurations. For example, FIG. 12 illustrates a scleral lens 1 with a channel 6 having a serpentine configuration. The illustrated serpentine configuration has three curves, of course more or fewer curves could be used in accordance with the present invention. Multiple serpentine patterns may be formed into the scleral contact area of the lens. The preferred number is up to 36. As illustrated in FIG. 13, the scleral lens 1 can have a channel 6 with an arcuate configuration with the channel extending primarily radially. The arcuate channel 6 may have a small radius (which makes a sharper curve) or a larger radius (which makes a gradually sloping curve). These curves extend to the rims of the scleral lens surfaces.

3. Circumferential Fenestrated Channel

Figure 7:
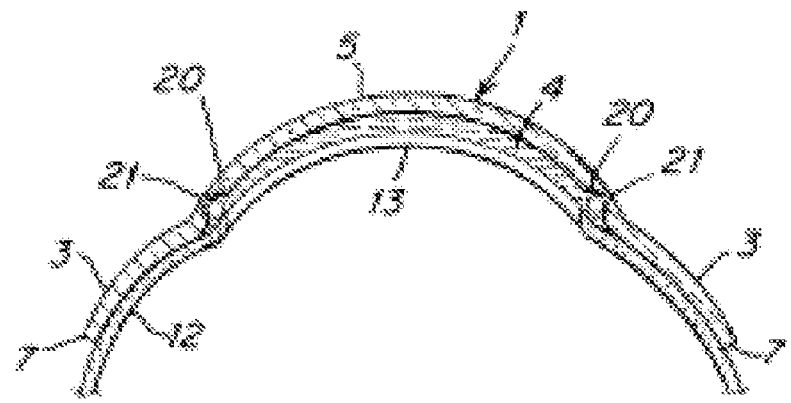
FIG. 7 is a cross-sectional view of a scleral lens with a circumferential fenestrated channel.
Figure 8:
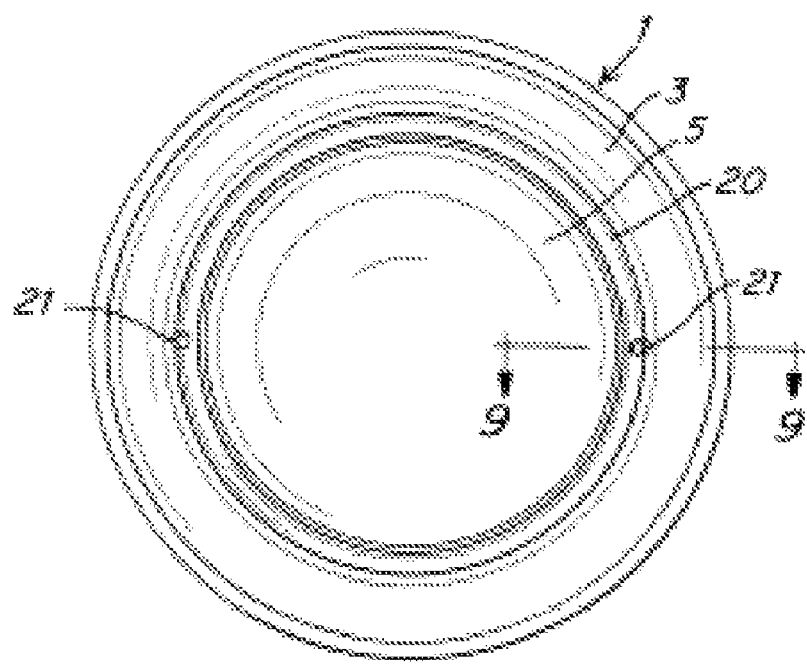
FIG. 8 is a plan view of a scleral lens with a circumferential fenestrated channel with round fenestrations.

A scleral lens 1 with a circumferential fenestrated channel 20 and fenestrations 21 is shown in FIGS. 7 and 8. As used herein, the term fenestration refers to an opening defined by the scleral lens that allows for fluid and/or gaseous communication between the fluid compartment 4 and the outside of the scleral lens. FIGS. 7 and 8 show a scleral lens 1 with a single circumferential fenestrated channel 20 that circumscribes the peripheral portion of the posterior side of the optic portion 5 of the scleral lens such that the circumferential fenestrated channel lies over the peripheral surface of the cornea when it is worn, wherein the circumferential fenestrated channel defines at least fenestration to the anterior side of the lens. This channel is referred to herein as a circumferential fenestrated channel.

The scleral portion 3 touches only the sclera 12 of the eye, or the sclera 12 of the eye and the peripheral surface of the cornea 13. The optic portion 5 covers the cornea without touching the cornea, thereby defining a fluid compartment 4. The optic portion may optionally be corrective. The greatest distance between the surface of the cornea and the posterior side of the optic portion is typically at least 30 microns.

Figure 9:
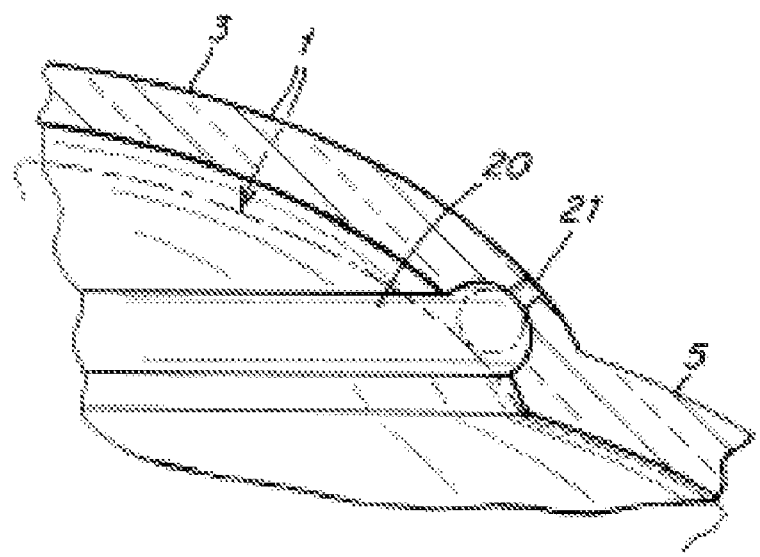
FIG. 9 is an enlarged fragmentary cross-sectional view taken along line 9-9 of FIG. 8.

Referring to FIG. 9, the circumferential fenestrated channel 20 prevents adhesion and suction between the cornea and the scleral lens 1. The circumferential fenestrated channel 20 defines at least one fenestration 21. The fenestration(s) 21 are openings through which air bubbles and/or fluid are aspirated and expelled by the pumping action of the lens (compression/decompression) actuated by blinking and eye movement. The lens compresses when the eyelid closes, and decompresses when the eyelid opens, and creates turbulence by forcing air bubbles and/or fluid through the fenestration(s) 21. The phantom line in FIG. 9 shows the scleral lens in its compressed position. It is believed that the turbulence prevents the accumulation of cellular debris and mucin, which prevents adhesion between the cornea and the scleral lens.

Furthermore, the circumferential fenestrated channel 20 provides sufficient space for the air bubbles aspirated through the fenestration(s) 21 to expand into and move along the circumferential fenestrated channel 20. The expansion, contraction, and motility of the air bubbles creates sufficient turbulence in the fluid compartment 4 to prevent mucin accumulation on the surface of the cornea, and thus prevents suction between the eye and the scleral lens. The amount of turbulence generated in the fluid compartment can be further increased by sloping the inner edge of the circumferential fenestrated channel in the area of the fenestration.

Additionally, the circumferential fenestrated channel advantageously improves the comfort of the scleral lens by reducing adhesion and suction.

Furthermore, the circumferential fenestrated channel advantageously increases the ease of fitting a scleral lens to an eye. In a scleral lens without the circumferential fenestrated channel, the scleral portion of the scleral lens must perfectly follow the shape of the sclera to minimize suction, otherwise the scleral portion will dig into the eye. This creates zones of compression which can lead to suction. The circumferential fenestrated channel reduces suction between the scleral lens and the eye, therefore the scleral portion of the scleral lens is not required to perfectly follow the shape of the sclera. This allows for a more forgiving scleral lens with regard to fitting and suction.

The circumferential channel also prevents the aspirated air bubbles from interfering with vision by functioning as a reservoir for the air bubbles, thereby preventing the air bubbles from migrating centrally under the optic portion of the scleral lens.

Figure 10:
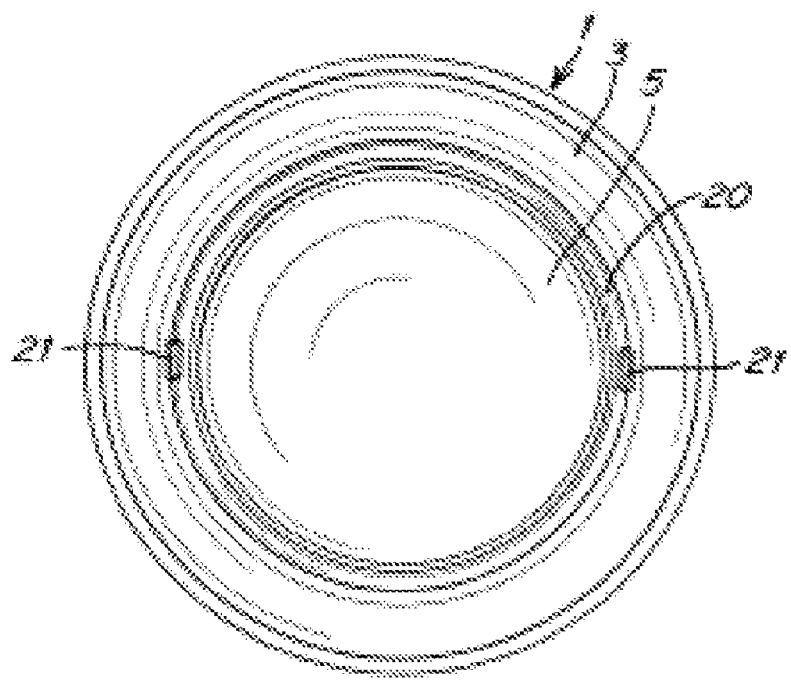
FIG. 10 is a plan view of a scleral lens with a circumferential fenestrated channel where the fenestrations are slots.

The size of the fenestrations can vary from about 100μ to about 0.2 mm in diameter. Referring to FIG. 10, the fenestrations 21 may alternatively comprise one or more slots. The width of the slot fenestrations can range from about 100μ to about 0.2 mm, and their length is limited only by the need to maintain the physical integrity of the lens while it is handled or worn.

The channel may have one or more of several different cross-sections as illustrated in FIGS. 11A-11E. The channel may alternatively be of a different polygonal shape. The dimensions and shape of the channel can be modified to allow for improved turbulence in the fluid compartment.

Example 1

A patient suffered severe damage to the surface tissues of his eyes from a life-threatening allergic reaction known as Stevens-Johnson syndrome. The edge of his lids were transformed into sandpaper-like tissue and abnormal lashes grew like tiny barbs rubbing the surface of the eyes each time he blinked. His corneas became ulcerated and he suffered unending excruciating eye pain and legal blindness. Surgery was not an option. The patient was fitted with a scleral lens. The fluid compartment of the scleral lens acted as a protective "liquid bandage" of artificial tears over the cornea to relieve pain instantly. The corneal ulcers healed and the scleral lens improved vision dramatically. However, because the bearing scleral surface of the eye on which the scleral lens rests was scarred, its fluid compartment was sealed and the lens became suctioned to the eye. Radial channels were created in the haptic bearing surface of the scleral lens to facilitate tear-fluid exchange and avoid suction. However, the terminals of the channels at the edge of the lens were blocked by the scarred tissue. This blockage was alleviated by scalloping the edge of the lens at the termination of the radial channels and the patient was able to wear the scleral lens comfortably all his waking hours.

Example 2

A patient underwent corneal transplant surgery in her only functioning eye but vision with glasses was no better than 20/200 because of the distorted surface of the graft. A scleral lens improved vision to 20/30 but could not be fitted because glaucoma surgery had reduced the available scleral bearing surface for the lens to a diameter of 14.0 mm. Traditional scleral lenses provoked swelling of the cornea and adhesion. Scalloped channels failed to solve this problem. A fenestrated circumferential channel was formed on the posterior side of a traditional scleral lens. The scleral lens with the fenestrated circumferential channel was fitted to the patient. The patient wore the scleral lens with the fenestrated circumferential channel for more than 10 hours a day without experiencing adhesion or swelling of the graft.

What is claimed is:

1. A scleral lens to be disposed on an eye, the scleral lens comprising:
an optic portion having a first curvature, and a scleral portion having a second curvature, wherein:
    (a) the first curvature is adapted to cover a cornea of the eye without substantially touching the cornea;
    (b) the second curvature is adapted to contact the scleral portion of the eye without substantially touching the cornea;
    (c) the optic portion and the scleral portion intersect to form an angle less than 180 degrees measured from the anterior side of the scleral lens;
    (d) the scleral portion has an inner rim bounding the optic portion and an outside rim bounding the outside of the scleral lens;
    (e) the scleral portion further comprises at least one channel extending radially from the inner rim to the outside rim; and
    (f) the outside rim of the scleral portion defines a scallop where the channel intersects the outside rim of the scleral portion.

2. The scleral lens of claim 1, wherein at least one channel is arcuate.

3. The scleral lens of claim 1, wherein the at least one channel is serpentine.

4. The scleral lens of claim 1, wherein the width of the scallop ranges from about 3% to about 17% of the circumference of the outside rim of the scleral portion.

5. The scleral lens of claim 1, wherein the width of the scallop ranges from about 10° to about 60° of the circumference of the outside rim of the scleral portion.

6. The scleral lens of claim 1, wherein the angle of the scallop at the intersection of the channel and the outside rim of the scleral lens ranges from about 0° to about 90°.

7. The scleral lens of claim 1, wherein the depth of the scallop is less than about 80% of the length between the inner rim and the outside rim of the scleral lens.

8. The scleral lens of claim 1, wherein the second curvature is adapted to contact the scleral portion of the eye such that the scleral portion of the lens touches the scleral portion of the eye and only the peripheral portion of the cornea.

9. A scleral lens to be disposed on an eye, the scleral lens comprising:
an optic portion having a first curvature, and a scleral portion having a second curvature, wherein:
    (a) the first curvature is adapted to cover a cornea of the eye without substantially touching the cornea;
    (b) the second curvature is adapted to contact the scleral portion of the eye without substantially touching the cornea;
    (c) the optic portion and the scleral portion intersect to form an angle less than 180 degrees measured from the anterior side of the scleral lens;
    (d) the optic portion further comprises a channel circumscribing the entire optic portion of the scleral lens such that the channel lies over the peripheral surface of the cornea when the scleral lens is disposed on the eye; and
    (e) the channel defines at least one fenestration to the anterior side of the lens.

10. The scleral lens of claim 9, wherein the scleral lens prevents the accumulation of cellular debris and mucin between the eye and the scleral lens.

11. The scleral lens of claim 10, wherein the one or more fenestrations are round.

12. The scleral lens of claim 11, wherein the diameter of the one or more fenestrations are between about 100μ to about 0.2 mm.

13. The scleral lens of claim 11, wherein the one or more fenestrations are not round.

14. The scleral lens of claim 13, wherein the one or more fenestrations are rectangular.

15. The scleral lens of claim 13, wherein the one or more fenestrations are oval.

16. The scleral lens of claim 13, wherein the narrowest dimension of the one or more fenestrations is between about 100μ to about 0.2 mm.

17. The scleral lens of claim 10, wherein the scleral lens prevents suction between the eye and the scleral lens.

18. The scleral lens of claim 10, wherein the scleral lens prevents adhesion between the eye and the scleral lens.

19. The scleral lens of claim 10, wherein the second curvature is adapted to contact the scleral portion of the eye such that the scleral portion of the lens touches the scleral portion of the eye and only the peripheral portion of the cornea.

* * * * *